United States Patent
Laborie et al.

(10) Patent No.: US 6,883,861 B2
(45) Date of Patent: Apr. 26, 2005

(54) STRUCTURING AIR DUCT

(75) Inventors: Jean-Michel Laborie, Bagnac sur Celle (FR); David Duchez, Meru (FR)

(73) Assignee: Faurecia Interieur Industrie, Nanterre (FR)

( * ) Notice: Subject to any disclaimer, the term of this patent is extended or adjusted under 35 U.S.C. 154(b) by 23 days.

(21) Appl. No.: 10/475,971

(22) PCT Filed: Apr. 26, 2002

(86) PCT No.: PCT/FR02/01469

§ 371 (c)(1),
(2), (4) Date: Oct. 27, 2003

(87) PCT Pub. No.: WO02/087911

PCT Pub. Date: Nov. 7, 2002

(65) Prior Publication Data

US 2004/0169401 A1 Sep. 2, 2004

(30) Foreign Application Priority Data

Apr. 27, 2001 (FR) .......................................... 01 05711

(51) Int. Cl.[7] .............................................. B62D 25/08
(52) U.S. Cl. .......................... 296/208; 296/70; 454/69
(58) Field of Search ..................... 296/208, 70, 193.02; 454/69; 180/90

(56) References Cited

U.S. PATENT DOCUMENTS 5,406,170 A * 4/1995 Uemura et al. ............. 313/495
6,273,495 B1 * 8/2001 Haba et al. ............. 296/193.02
6,582,011 B2 * 6/2003 Palazzolo et al. ........... 296/208

FOREIGN PATENT DOCUMENTS

| DE | 89 12 822  | 2/1990  |
|----|------------|---------|
| DE | 196 23 579 | 12/1997 |
| FR | 2 772 682  | 6/1999  |
| FR | 2 789 043  | 8/2000  |
| FR | 2 796 577  | 1/2001  |

OTHER PUBLICATIONS

Patent Abstracts of Japan, vol. 010, No. 365 (M–542), Dec. 6, 1986 & JP 61 160316 A (Toyota Motor Corp), Jul. 21, 1986 cited in the application abstract.

* cited by examiner

Primary Examiner—Joseph D. Pape
(74) Attorney, Agent, or Firm—Young & Thompson

(57) ABSTRACT

The invention concerns a motor vehicle air duct also serving as crosspiece forming part of the structure of the vehicle. The invention is characterised in that the duct comprises two half-shells (2, 12) including each a tubular portion (6, 16) and two lateral flanks (4a, 4b; 14a, 14b); it further comprises: two stop elements (22a, 22b) defining each a rib projecting relative to one of the contact surfaces of one of the half-shells and having a stop surface arranged immediately proximate to an abutting surface (40a, 40b) provided on the other half-shell (12), a continuous weld bead (13a, 13b) extending between the contact surfaces of the half-shells which are in contact with each other.

11 Claims, 3 Drawing Sheets

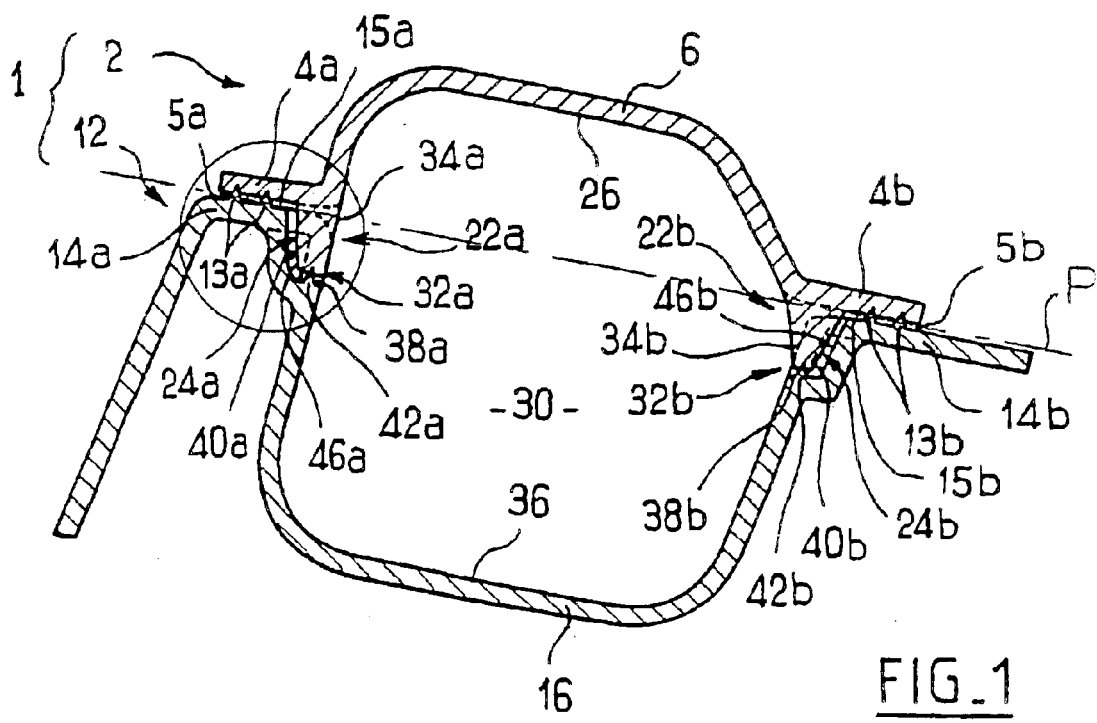
FIG_1
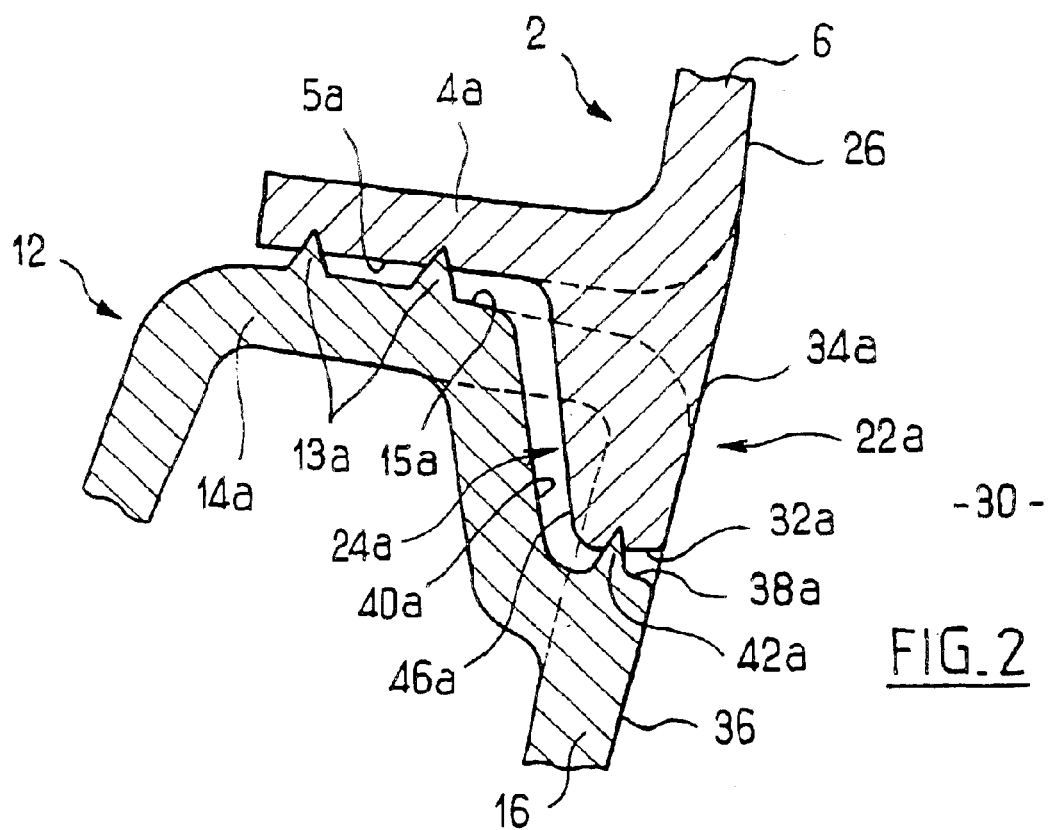
FIG_2

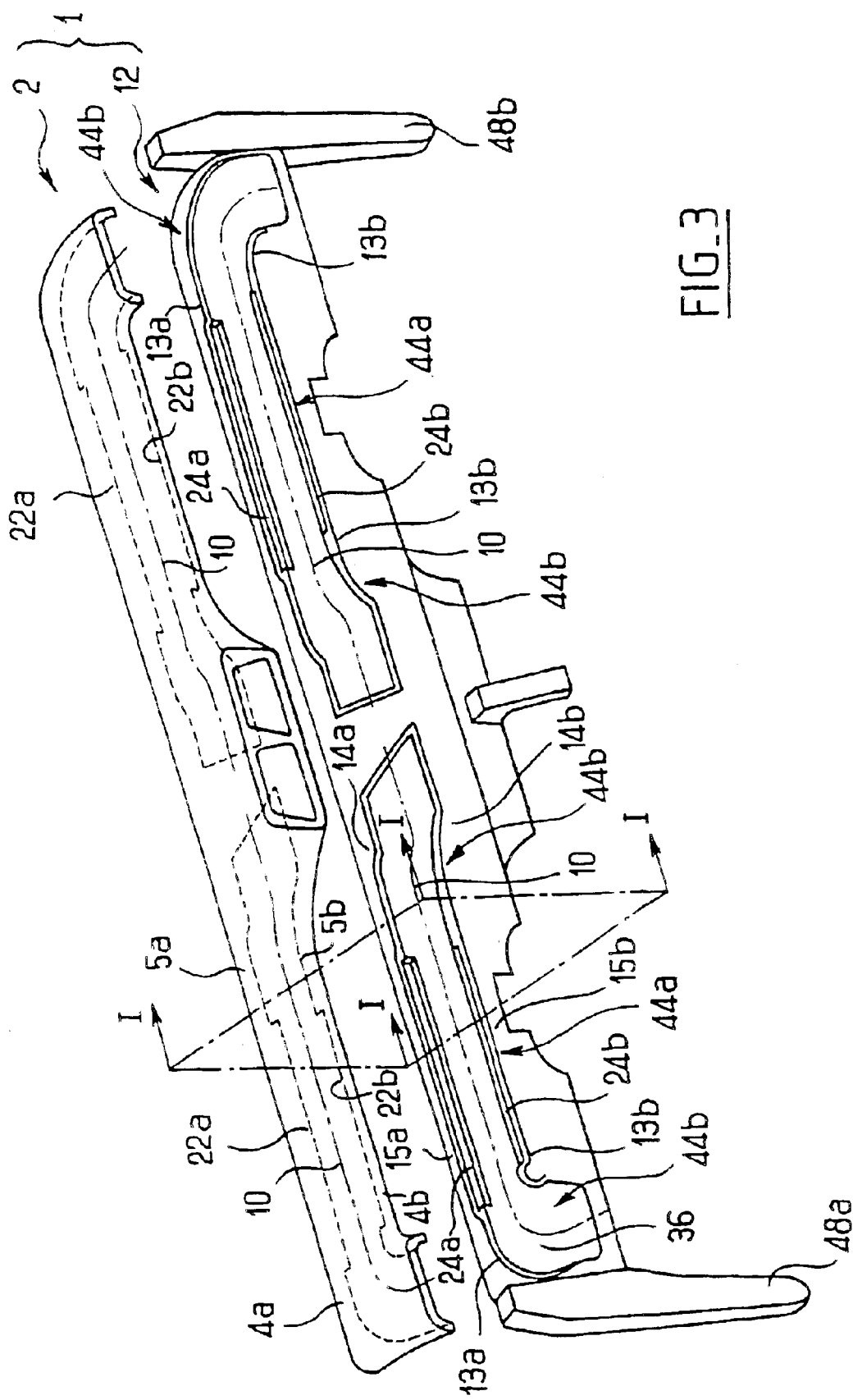
FIG_3

STRUCTURING AIR DUCT

BACKGROUND OF THE INVENTION

The invention relates to an air duct of a motor vehicle.

The invention relates more precisely to an air duct of the structuring type, which supports some of the forces to which the vehicle is subjected, the air duct acting in particular also as a crosspiece forming part of the structure of the vehicle and supporting various accessories.

The invention aims to provide, in a simple, reliable and inexpensive manner, an air duct having a high degree of mechanical strength and satisfactory sealing with respect to the air that has to circulate inside it.

As indicated in the introductory part of FR-A-2 796 577, it is known to produce a motor vehicle air duct extending in a direction of elongation and comprising two half-shells arranged opposite one another, such that each half-shell has:

- a tubular portion extending in the direction of elongation of the duct, the tubular portions defining between them an air cavity extending in said direction of elongation,
- two lateral flanks extending one on each side of the tubular portion and each having a contact surface in contact with one of the contact surfaces of the other half-shell, and
- a continuous weld seam extends substantially in the direction of elongation of the duct between the contact surfaces of the half-shells which are in contact with one another.

Although such a solution provides sealing between the two half-shells, it is not entirely satisfactory as regards mechanical strength in the case of impact. The applicant has noticed that the continuous weld seam has the advantage over a discontinuous weld (for example an ultrasonic weld, which is constituted by a succession of spots) of providing sealing between the half-shells but that it also has a weakness in terms of mechanical strength.

When an accident occurs, the air duct is subjected to multi-axial mechanical forces in different regions located in particular at the steering column and the airbag module. Those forces have a component which shears the weld seam and when one of the weld seams is broken in one region, the breakage is propagated rapidly in the direction of elongation of the duct, so that the duct opens laterally. The mechanical strength of the duct is then considerably reduced.

This is particularly true in the case of front impact where the front supports of the vehicle have a tendency to move towards one another and to cause the structuring air duct to be bent.

consequently, the solution indicated in the introductory part of FR-A-2 796 577 has not proved to be mechanically satisfactory.

In addition, JP-A-61 160316 discloses an air duct comprising two half-shells which are in contact with one another by way of lateral flanks and which are held together by foaming. In order to prevent the foam from entering the inside of the duct, baffles formed by ribs projecting relative to the contact surfaces are provided.

However, the various embodiments illustrated in JP-A-61 160316 are not entirely satisfactory, in particular as regards the assembly of the two half-shells by screwing, which is very time-consuming.

Moreover, the technique of foaming is relatively complex to implement, can be used economically only in certain special cases (duct near the outer surface of the dashboard) and does not, as such, provide a high degree of cohesion between the half-shells and consequently a strong resistance on the part of the duct towards the stresses to which the vehicle is subjected.

SUMMARY OF THE INVENTION

In order to overcome the above-mentioned disadvantages, the invention proposes that said half-shells also have two stop elements having the following features:

- each stop element defines a rib extending in the direction of elongation of the duct and projecting relative to one of the contact surfaces,
- each stop element has, in a direction perpendicular to the contact surface relative to which it projects, an end region,
- each stop element has a stop surface extending between the end region and one of the contact surfaces, said stop surface belonging to one of the half-shells and being in the immediate vicinity of an abutment surface provided on the other half-shell.

The continuous weld seam and the stop elements are two entirely complementary means. The stop elements not only enable the positioning of the half-shells relative to one another to be facilitated but above all enable the mechanical strength of the duct with regard to the weld seam to be considerably increased. When the duct is subjected to said strong forces, the stop elements abut the stop surfaces, absorb some of the forces to which the duct is subjected and thus relieve the weld, in particular by efficiently countering the torsional and shearing forces to which the weld is subjected. For its part, said continuous weld seam, in a single operation, provides sealing between the half-shells and connects them to one another.

Such a continuous weld seam can be produced by providing a strip on two of the contact surfaces and by causing the two half-shells in contact with one another to vibrate or by using a heating mirror.

According to a first feature, the invention proposes that:

- each stop element is located between the tubular portion of one of the half-shells and one of the flanks of said half-shell,
- the duct also has two recessed regions complementing the stop elements,
- said recessed regions incorporate said abutment surfaces.

This solution gives a relatively simple, strong and compact duct.

According to an additional feature, the invention proposes that:

- each tubular portion has an internal surface partially delimiting the air cavity,
- each stop element has an internal surface partially delimiting the air cavity,
- the internal surface of the stop elements forms an extension of the internal surface of each tubular portion without forming a step relative thereto.

Thus, although the stop elements are located in the immediate vicinity of the air cavity, they do not project into said air cavity and do not disturb the flow inside it. Problems of noise or loss of head are thus avoided.

In order to simplify the production of the duct and to simplify the positioning of the two half-shells, the invention proposes that:

- the two stop elements are both located on one of the half-shells,
- the two recessed regions are provided on the other half-shell.

In order further to improve the strength of the duct, the invention proposes that the duct also comprises, in said end region of the stop elements, at least one weld seam connecting the two half-shells.

This weld seam contributes all the more to improving the mechanical strength of the duct because it is not located in the same plane as the weld seam between the contact surfaces.

Advantageously, the stop surfaces form an angle of from 45 degrees to 90 degrees with the flat contact surfaces in order to create an efficient abutment for opposing the torsional and shearing forces to which the duct is subjected.

According to another advantageous feature of the invention, the weld seam is produced by vibration, so that the duct has the following features:

the weld seam is formed by a strip extending in the direction of elongation of the duct, it comprises at least one rectilinear portion and one curved portion, the stop elements are present in the rectilinear portion and absent from the curved portion.

Bearing in mind the relative displacement (translation) between the two half-shells which is necessary in order to produce this type of weld, it is not possible to arrange the stop elements in the curved portion.

The invention will emerge even more clearly from the following description which is given with reference to the appended drawings in which:

BRIEF DESCRIPTION OF THE DRAWING

FIG. 1 is a view of a duct according to the invention in cross-section according to the plane marked I in FIG. 3, FIG. 2 is a view on an enlarged scale of the detail marked II in FIG. 1, FIG. 3 is a perspective exploded view of the duct.

DETAILED DESCRIPTION OF THE PREFERRED EMBODIMENTS

Figure 4:
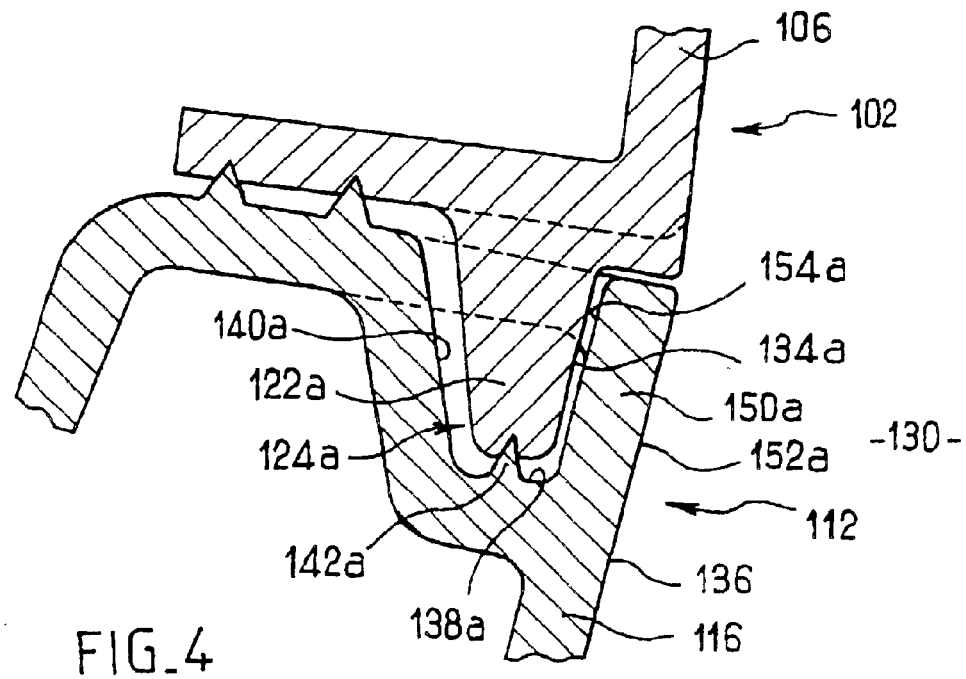
FIG. 4 is a view in conformity with FIG. 2 of a variant of the duct.

FIGS. 1 to 3 illustrate a duct 1 comprising an upper half-shell 2 and a lower half-shell 12 extending in a direction of elongation 10. Each half-shell 2, 12 comprises a front flank, upper 4a and lower 14a respectively, a rear flank, upper 4b and lower 14b respectively, and a tubular portion, upper 6 and lower 16 respectively, extending between the respective front and rear flanks. The tubular portions 6, 16 have an internal surface 26, 36 delimiting an air cavity 30, in this case in two parts.

The upper front flank 4a has a front upper surface 5a in contact with a front lower surface 15a belonging to the front lower flank 14a, while the upper rear flank 4b has a rear upper surface 5b in contact with a rear lower surface 15b belonging to the rear lower flank 14b. All these contact surfaces 5a, 5b, 15a, 15b are substantially flat and extend in a substantially horizontal plane P containing the direction of elongation 10.

The fact that the plane P is substantially horizontal promotes resistance to the forces generated by a front impact where the front supports of the vehicle have a tendency to cause bending of the duct 1 in a vertical plane containing the direction of elongation 10.

The upper contact surfaces 5a, 5b and lower contact surfaces 15a, 15b are connected to one another by means of two strips 13a, 13b (only one has been shown in FIG. 3) which project from each of the lower contact surfaces 15a, 15b and which merge with the respective upper contact surface 5a, 5b, in this case by setting in relative vibration the surfaces in contact with one another.

The upper half-shell 2 also comprises a rectilinear front rib 22a projecting from the front upper contact surface 5a and a likewise rectilinear rear rib 22b projecting from the rear upper contact surface 5b. The ribs 22a, 22b are located between the upper tubular portion 6 and each of the upper flanks 4a, 4b. They tend to extend the upper tubular portion beyond the upper flanks 4a, 4b and each have an end region 32a, 32b forming a crest, an internal surface 34a, 34b and an external surface 46a, 46b.

The internal surfaces 34a, 34b form an extension of the internal surfaces 26, 36 of the upper 6 and lower 16 tubular portions. In particular, the internal surface of the duct 1, including the internal surfaces 34a, 26, 34b and 36, has neither a step nor an interruption in curvature.

The external surfaces 46a, 46b of the ribs 22a, 22b, respectively, are substantially flat and extend substantially perpendicularly to the upper contact surfaces 5a, 5b from which they project.

The lower half-shell 12 has, opposite each of the ribs 22a, 22b, a recessed region 24a, 24b comprising a base surface 38a, 38b and an abutment surface 40a, 40b.

The abutment surfaces 40a, 40b are located opposite and in the immediate vicinity of (the spacing has been increased in the Figures for reasons of clarity) the external surfaces 46a, 46b in order to act as an abutment for the ribs 22a, 22b when the duct 1 is subjected to torsional or shearing forces.

In addition, the ribs 22a, 22b are welded to the lower half-shell 12 in their end region 32a, 32b, by way of a strip 42a, 42b projecting from the base surface 38a of the recessed regions 24a, 24b.

As illustrated in FIG. 3, the duct has rectilinear portions and curved portions. The ribs 22a, 22b are present only in the rectilinear portions and extend in the direction of elongation 10. On the other hand, the ribs 22a, 22b are absent from the curved portions owing to the constraints imposed by the vibration welding process. By using another welding process, for example, by heating mirror, it would be possible to arrange the ribs along the entire length of the duct 1.

The duct 1, in this case its lower half-shell 12, incorporates supports 48a, 48b for securing to the structure of the vehicle.

Depending on the level of force that the duct has to withstand, the duct is advantageously produced from acrylonitrile butadiene styrene (ABS) copolymer, or from polypropylene charged with talc at from 10% to 40% (by weight) and reinforced with glass fibres. Other materials would also be suitable. In particular, it is generally advantageous for the duct to be produced from a hybrid material comprising a metal core overmolded with plastics material.

FIG. 4 illustrates a variant of the duct which is basically distinguished from the embodiment illustrated in FIGS. 1 to 3 in that the ribs have been located slightly away from the tubular portions 106, 116 of the half-shells 102, 112. Elements corresponding to those in FIGS. 1 to 3 have a reference increased by 100.

Each recessed region 124a comprises a flange 150a having a first surface 152a defining a portion of the internal surface 136 delimiting the air cavity and a second surface 154a forming an abutment surface opposite the internal surface 134a of the corresponding rib 122a. Each of the recessed regions 124a in which one of the ribs 122a is inserted thus defines near the air cavity 130 a groove delimited by the base surface 138a and the abutment surfaces 140a, 154a extending one on each side of said rib 122a. The flanges 150a prevent the strips 142a from extending, after welding, into the air cavity 130 and generating air flow noise.

Figure 5:
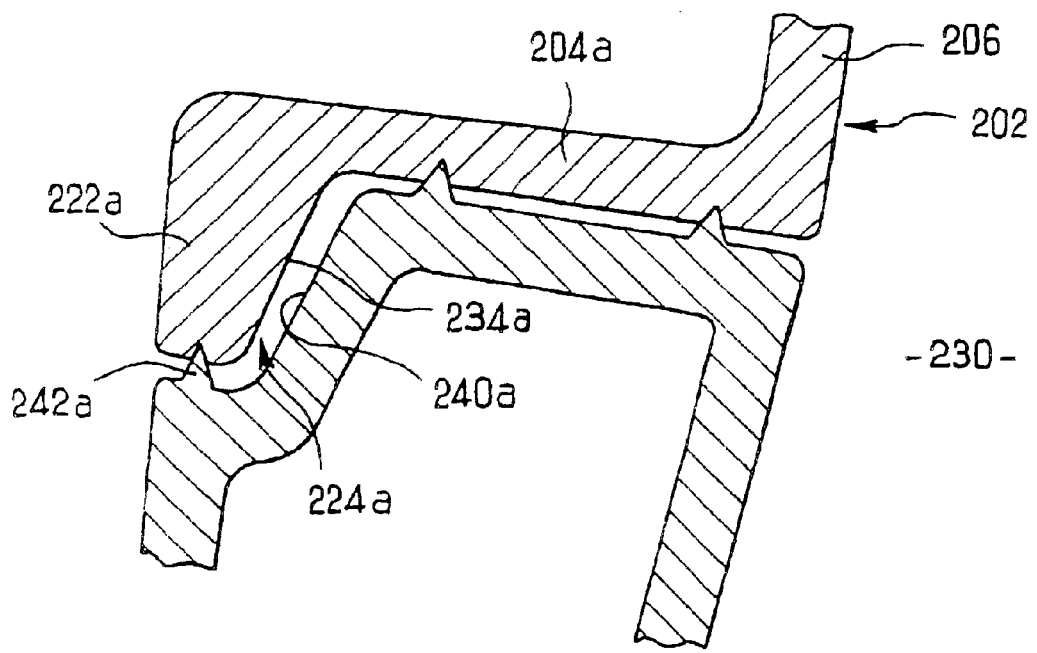
FIG. 5 is a view in conformity with FIG. 2 of another variant of the duct.

FIG. 5 illustrates a variant of the duct which is basically distinguished from the embodiment illustrated in FIGS. 1 to 3 in that the ribs have been located well away from the tubular portions of the half-shells, so that each upper flank 204a is located between one of the ribs 222a and the upper tubular portion 206 of the upper half-shell 202. Elements corresponding to those in FIGS. 1 to 3 have a reference increased by 200.

Each internal surface 234a is to act as an abutment for one of the ribs 222a and, more precisely, for the abutment surface 240a of the corresponding recessed region 224a. Thus there is no risk that, after welding, the strips 242a will extend into the air cavity 230 and generate air flow noise.

What is claimed is:

1. Air duct of a motor vehicle, extending in a direction of elongation and comprising two half-shells arranged opposite one another, such that:

each half-shell has:

a tubular portion extending in the direction of elongation of the duct, the tubular portions defining between them an air cavity extending in said direction of elongation;

two lateral flanks extending one on each side of the tubular portion and each having a contact surface in contact with one of the contact surfaces of the other half-shell, and a continuous weld seam extends substantially in the direction of elongation of the duct between the contact surfaces of the half-shells which are in contact with one another, wherein said half-shells also have two stop elements having the following features:

each stop element defines a rib extending in the direction of elongation of the duct and projecting relative to one of the contact surfaces, each stop element has, in a direction perpendicular to the contact surface relative to which it projects, and end region, each stop element has a stop surface extending between the end region and one of the contact surfaces, said stop surface belonging to one of the half-shells and being in the immediate vicinity of an abutment surface provided on the other half-shell.

2. Duct according to claim 1, wherein:

each stop element is located between the tubular portion of one of the half-shells and one of the flanks of said half-shell, the duct also has two recessed regions complementing the stop elements, said recessed regions incorporate said abutment surfaces.

3. Duct according to claim 2, wherein:

each tubular portion has an internal surface partially delimiting the air cavity, each stop element has an internal surface partially delimiting the air cavity, the internal surface of the stop elements forms an extension of the internal surface of each tubular portion without forming a step relative thereto.

4. Duct according to claim 1, wherein each stop element is located away from the tubular portion of the half-shells, the duct also has two recessed regions complementing the stop elements, said recessed regions incorporate said abutment surfaces.

5. Duct according to claim 4, wherein at least one of the recessed regions defines a groove having a base surface extending between two abutment surfaces located one on each side of the stop elements.

6. Duct according to claim 2, wherein:

the two stop elements are both located on one of the half-shells, the two recessed regions are provided on the other half-shell.

7. Duct according to claim 1, wherein the duct also comprises, in said end region of the stop elements, at least one weld seam connecting the two half-shells.

8. Duct according to claim 1, wherein the stop surfaces form an angle of from 45 to 90 degrees with the contact surfaces.

9. Duct according to claim 1, wherein the stop surfaces are substantially flat.

10. Duct according to claim 1, wherein:

the weld seam is formed by a strip extending in the direction of elongation of the duct, the duct comprises at least one rectilinear portion and one curved portion, the stop elements are present in the rectilinear portion and absent from the curved portion.

11. Duct according to claim 1, wherein it is constituted by a hybrid material comprising a metal core overmolded with plastics material.

* * * * *